United States Patent [19]
Gleichman

[11] 4,009,405
[45] Feb. 22, 1977

[54] VERTICALLY MOUNTABLE DYNAMOELECTRIC MACHINE HAVING AN IMPROVED VENTILATING COOLANT FLOW CONTROL STRUCTURES

[75] Inventor: Robert F. Gleichman, San Jose, Calif.

[73] Assignee: General Electric Company, Schenectady, N.Y.

[22] Filed: Aug. 7, 1975

[21] Appl. No.: 602,605

[52] U.S. Cl. .................................. 310/58; 310/157
[51] Int. Cl.² .................................. H02K 9/00
[58] Field of Search ............... 310/52, 53, 58, 59, 310/62–65, 157, 55

[56] References Cited

UNITED STATES PATENTS

| 1,742,182 | 1/1930 | Barr | 310/63 |
|---|---|---|---|
| 1,961,387 | 6/1934 | Pfleger | 310/63 |
| 2,074,067 | 3/1937 | Darnell | 310/62 |
| 2,114,907 | 4/1938 | Oesterlein | 310/63 |
| 3,094,272 | 6/1963 | McClure | 310/63 |
| 3,610,976 | 10/1971 | Wightman | 310/64 |
| 3,715,610 | 3/1972 | Brinkman | 310/58 |
| 3,725,706 | 4/1973 | Lukens | 310/62 |
| 3,749,949 | 7/1973 | Muller | 310/62 |
| 3,749,953 | 7/1973 | Baumann | 310/62 |
| 3,761,748 | 9/1973 | Baumann | 310/58 |

FOREIGN PATENTS OR APPLICATIONS

| 977,165 | 3/1951 | France | 310/62 |
|---|---|---|---|

*Primary Examiner*—R. Skudy
*Attorney, Agent, or Firm*—Vale P. Myles

[57] ABSTRACT

A vertical electric motor characterized by having a ventilation system consisting of air inlet passageways adjacent the top and bottom of the machine arranged in combination with air directing baffles, fans and airflow-controlling bleed apertures to provide an exhaust air flow that effectively limits contact between the turbulent, heated exhaust air streams and the streams of cooling air entering the motor. In particular, the structure and arrangement of the component parts of the motor ventilating system are such that an area of turbulent exhaust air is positioned farther away from generally axially oriented air inlet passageways at the top of the motor than to more radially oriented inlet air passageways at the bottom of the motor.

9 Claims, 1 Drawing Figure

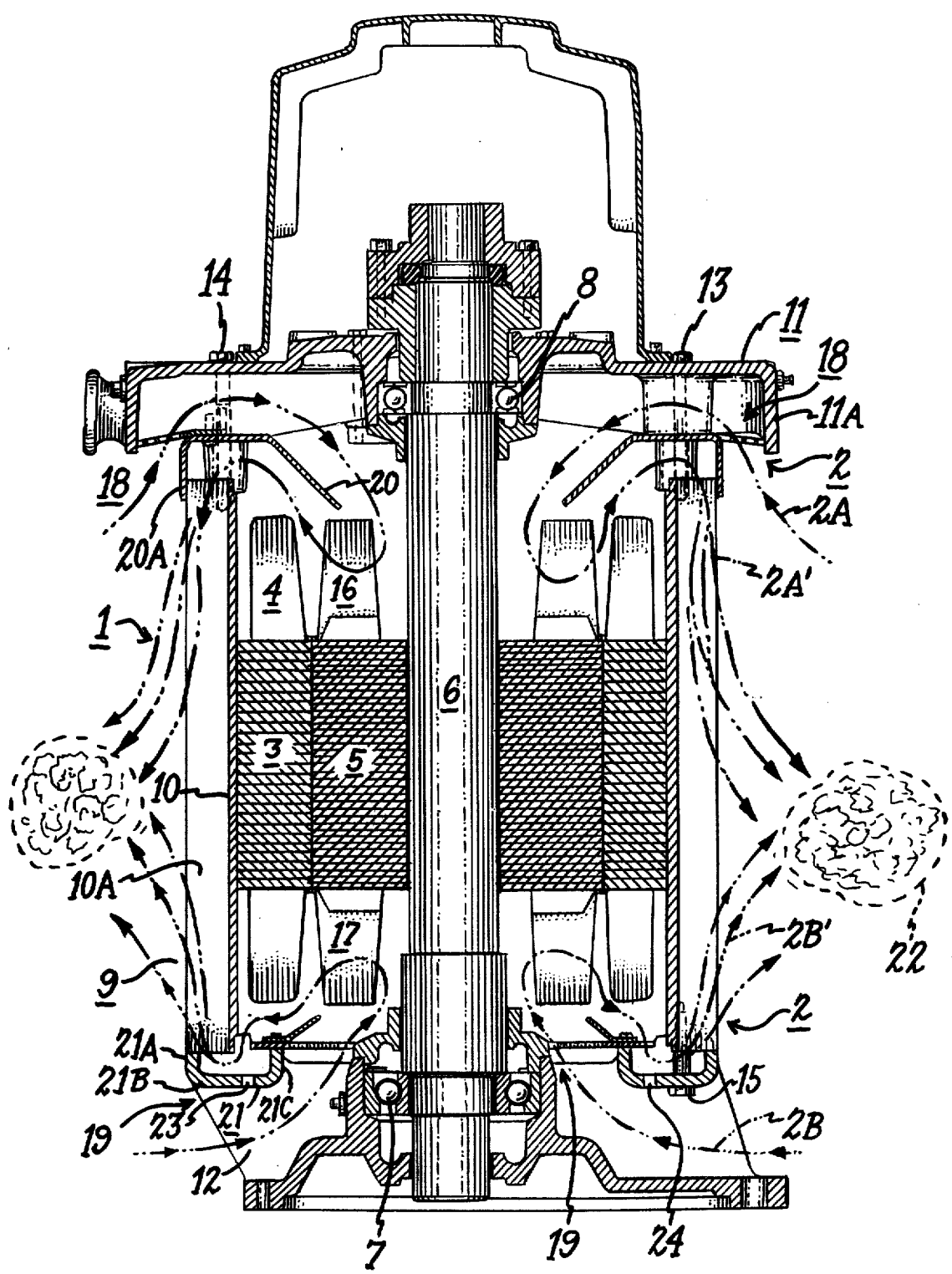

VERTICALLY MOUNTABLE DYNAMOELECTRIC MACHINE HAVING AN IMPROVED VENTILATING COOLANT FLOW CONTROL STRUCTURES

BACKGROUND OF THE INVENTION

The invention relates to dynamoelectric machines and more particularly, to a dynamoelectric machine ventilation means that is operable to control the degree of intermixing between heated exhaust air leaving the machine and cooler air entering it.

Because of the direct relationship between electric motor ratings and the ability of the motors to effectively dissipate heat, many earlier inventions have been concerned with various improvements in the ventilating structures for such machines. As a consequence, the incorporation of such features as double-end ventilation, fans mounted on both ends of the rotors of electric motors, heat radiating fins mounted on the exterior housings of motors, and air flow directing baffles to afford optium circulation of cooling air around motor windings, are all well known in the prior art. For example, U.S. Pat. No. 3,725,706 - Lukens, which issued on Apr. 3, 1973 and is assigned to the same assignee as the present invention, illustrates a horizontally mountable electric motor ventilation system that incorporates one desirable form of all of these particular motor ventilation means. The application of such relatively conventional ventilating structures to either vertically mounted or horizontally mounted dynamoelectric machines is frequently merely a matter of design choice that is well within the skill of those employed in the design of both types of motors. However, the design of ventilating means for vertical electric motors poses some problems that are peculiar to such motors, and special devices must be employed to solve such problems. One basic consideration in this regard is that heated air generated by vertical motors tends to rise upward within the motor housing and along its outer surface. This flow of convection currents, coupled with other considerations unique to the design of vertical motors, makes it impractical, or in some cases impossible to utilize the type of ventilating arrangements that are suitable for cooling horizontally mounted electric motors. In general, the design of a vertical electric motor must recognize and accommodate the fact that if an identical cooling system is utilized to cool both ends of the motor there will probably be an undesirable concentration of hot spots developed at the upper end of the motor. Despite this fact, some prior art electric motors have simply utilized such horizontal-type ventilating arrangements and have accepted the consequences of operating inefficiencies resulting from the relative over-heating of the upper end turns of the motor. In other earlier vertical motor designs, exhaust air from the lower ends of the motors has been intermixed with the cooling air entering the bottom of the motors to preheat it. In such designs it is sometimes found that the bottom end of the motor actually becomes more heated than the top end.

In view of the continuing interest in increasing the operating efficiency and overall rating of electric motors, it is desirable to design vertical motors to incorporate ventilating means that provide optimum cooling efficiency for both the top and bottom end turns of the motor windings. Accordingly, it is a primary object of the present invention to provide a vertical motor ventilation means that overcomes the unbalanced cooling effect of prior art cooling systems for vertical motors.

Another object of the present invention is to provide a vertical motor ventilating means that utilizes exhaust air streams directed axially along the motor housing from both ends thereof in a manner such that the exhaust air streams form a region of turbulent intermixed air that is located substantially closer to the bottom of the motor than to its upper end.

Yet another object of the invention is to provide a vertical electric motor with a ventilating means that restricts the mixing of heated exhaust air from the motor with entering cooling air. A still further object of the invention is to provide a vertical motor with a ventilating means that incorporates uniquely formed baffles and motor end cap structures that cooperate to allow a larger stream of cooling air to enter the upper end of the motor than is allowed to enter the bottom end of the motor, and to direct streams of exhaust air from the upper end of the motor axially along its outer housing surface, while directing exhaust streams from the bottom end of the motor more radially outward from the motor housing.

Additional objects and advantages of the invention will become apparent to those skilled in the art from the description of it given herein, considered in connection with the attached drawing.

SUMMARY OF THE INVENTION

In one preferred embodiment of the invention a vertical electric motor is provided with a ventilation means comprising fans, flow directing baffles and passageways, and exhaust flow regulating bleed apertures, all of which are designed to operate in combination to mix heated exhaust air from both ends of the motor in a region that surrounds the motor in a band-like region located substantially closer to the base of the motor than to its upper end. By thus positioning the band of turbulent exhaust air downward from axially oriented cooling air inlet passageways at the upper end of the motor, and closer to more radially oriented cooling air inlet passageways at the base of the motor, the ventilating means is effective to limit in a desired manner the amount of intermixing that occurs between heated exhaust air and cooler inlet air for the motor.

BRIEF DESCRIPTION OF THE DRAWING

The sole FIGURE of the drawing comprises an axial cross section view of a vertical motor to illustrate a ventilating means incorporated therein and constructed pursuant to the teaching of the present invention.

DESCRIPTION OF THE PREFERRED EMBODIMENT

Referring now to the drawing, it will be seen that there is shown a vertical electric motor 1 that incorporates a ventilation means generally designated by the numbers 2, 2, for controlling the mixing of intake air and exhaust air that is used as a motor coolant. The cooling air flow paths through the motor are identified generally by the curved arrows 2A and 2B, respectively, at the upper and lower ends of the motor. In general, the motor 1 includes a laminated stator 3, a stator winding 4 mounted on the stator in a conventional manner, and a suitable wound or cast rotor 5 that is mounted on an axial shaft 6, which in turn is journaled for rotation within the stator, on thrust bearing 7 and guide bearing 8.

The motor housing 9 includes a central cylindrical element 10 having a plurality of radially extending, spaced ribs 10A integrally formed therewith by being molded or otherwise conventionally formed. As is well known in the motor field, the ribs 10A are designed to form axial channels for receiving some of the air that is exhausted from the motor housing, as will be more fully described below. It will be noted that the central housing element 10 is disposed tightly about the laminations of stator 3 and extends beyond both ends of the stator winding 4. The motor housing 9 further includes first and second end caps 11 and 12 mounted respectively on the top and bottom ends of the central element 9. (Actually, the end caps serve as shields and are often referred to simply as end shields). Any suitable means may be used to secure the three major component parts of the housing 9 together, but in this form of the invention the top end cap 11 is secured to the central element 10 by a plurality of bolts 13, 14, etc. that extend through apertures in the end cap into threaded bores formed in the ribs (10A) of the central housing element 10. Likewise, a plurality of bolts, such as the bolt 15 shown at the bottom of the motor 1 in the drawing, are used to secure the second end cap 12 to the central element 10. All of the foregoing component parts of the illustrated dynamoelectric machine 1 are relatively conventional in form and may be fabricated of various well known structures and materials without departing from the present invention, as will be apparent from the following description.

Mounted respectively on opposite ends of the rotor 5 are respective ones of a pair of generally equivalent-volume fans 16 and 17 which are effective when rotated to draw cooling air into the housing through passageways that are formed, at least partly, by the end caps 11 and 12, in the areas indicated respectively by the arrows 2A and 2B therethrough. The fans 16 and 17 are further effective to force air from the housing 9 through exhaust ports formed in part by the central housing element 10 and by baffles that will be described below.

The motor ventilation means of the present invention comprises first air inlet passageways 18 that are disposed between the top end cap 11 and the central housing element 10, and second air inlet passages 19 through the bottom end cap or shield 12. An important feature of the present invention is that the combined cross sectional area of the first air inlet passageways 18 is in the range of about 10 to about 60 percent larger than the combined cross sectional area of the second air inlet passageway 19. This predetermined relative difference in size between the air inlet passageways 18 and 19 is effective to permit a sufficiently greater volume of cooling air to enter and leave the upper end of the motor than enters and leaves the bottom end thereof, due to the driving force of the substantially equivalent sized fans 16 and 17 on the rotor 5, to help afford the desired objective of positioning a region of turbulent intermixing suitably far away from the top of the motor. This effect is further enhanced by proportioning the areas of the first and second air outlet passageways in the same predetermined relative size difference as is applied to the corresponding air inlet passageways.

Another significant feature of the present invention is the arrangement of the first air inlet passageways 18 which are disposed to receive air flowing axially upward along the top, outer end of the central housing element 10, while the second air inlet passageways 19 at the bottom of the motor 1 are arranged to receive air flowing more radially inward with respect to the bottom, outer end of the cyclindrical surface of the central housing element 10. In addition to these characteristic structural features of the invention, first and second annular baffles 20 and 21 are mounted, respectively, adjacent the top and bottom ends of the central housing element 10 to direct air forced from the motor housing 9 to flow in generally axially directed streams 2A' and 2B' along the exterior surface of the central housing element 10.

As clearly shown in the drawing, the baffles 20 and 21 are both generally U-shaped in cross section through one side thereof, but it will be noted that the outer leg 20A of the baffle 20 is formed to overlie at least one-eighth inch of the upper, outermost surfaces of the air-directing ribs 10A so that all of the streams of exhaust air 2A' are forced to at least initially flow vertically downward along the exterior surface of the motor 1. On the other hand, pursuant to the invention, the outer leg portion 21A of the second baffle 21, at the bottom of the motor 1, is positioned so that it does not overlap or extend upward along the bottom end of the central housing element 10, or the ribs 10A. This novel confirguration and arrangement of the baffles 20 and 21 is effective to cause the streams of air 2A' and 2B' exhausted from the top and bottom ends, respectively, of the motor 1 to become mixed at a region adjacent the central housing element 10 which is substantially closer to the bottom of the motor 1 than to the top thereof. This region is designated generally by the numeral 22 at the confluence of the exhaust streams 2A' and 2B'. This advantageous location of the region of turbulent, heated exhaust air is effective to prevent a major portion of the heated exhaust air from undesirably mixing with and preheating air entering the axially disposed inlet passageways 18 at the top of the motor. Of course, the relatively radial orientation of the bottom air inlets 19 also prevents such undesirable mixing and preheating of the turbulent exhaust air with the cooling air stream 2B entering the bottom of the motor.

To further enhance the regulation or control of the relative vertical position of the region or annular band of turbulent heated air 22 caused by the confluence of the exhaust streams 2A' and 2B', wall means are suitably formed by drilling, punching or other means, to define in the base portion 21B of the second baffle 21 a plurality of apertures 23, 24 etc. that extend through the bottom portion 21B of second baffle 21, between the upwardly extending side 21A and 21C thereof. A wide variety of sizes and numbers of such apertures may be used to effectively bleed some of the air from the exhaust stream 2B' to weaken its upward thrust, as desired in given applications. However, in the preferred form of the invention it has been found that the vertical position of the turbulent annular region 22 can be positioned substantially below the horizontal centerline of the central housing element 10 by providing at least four apertures 23, 24 etc. through the base portion 21B of second baffle 21 at points thereon spaced approximtely 90° from one another, provided that the apertures (23, 24) are at least approximately ¼ of an inch in diameter.

Finally, in order to enable the exhaust stream 2B' leaving the lower portion of the motor 1 to project more radially outward from the central housing element 10 than the sharply axially directed exhaust stream 2A' leaving the upper end of the motor housing 9, the outer leg portion 21A of second baffle 21 is substantially shorter than the inner leg portion 21C thereof. In particular, it will be ntoed that this configuration of the second baffle 21 causes the top end of the inner leg portion to extend upward past the lower end of the central housing element and thereby causes air forced into the baffle 21 to enter it in a more nearly axial path (relative to the central housing portion 10) than the path of air leaving the second baffle is forced to travel past the shorter outer leg portion 21A, which enables exhaust air to flow outward in a more radial path. Thus, this more radial outward direction of the exhaust path 2B' further ensures the relatively lower positioning of the turbulent mixing region 22, as is desired in the operation of the invention. In the preferred embodiment disclosed here the outer leg portion 21A is ⅛ inch shorter than the inner leg portion 21C, but it will be recognized that by further shortening outer leg portion 21C, the area of confluence of exhaust streams 2A' and 2B' can be lowered, as may be desirable for certain motor ratings or applications.

To enable the inlet stream of cooling air 2A at the upper end of motor 1 to enter the motor housing 9 without being forced more directly into contact with the exhaust stream 2A', the first end cap 11 is generally circular in outline and is formed to have a diameter that substantially exceeds the diameter of the central housing element 9 and the ribs 10A projecting outward therefrom. As seen in the drawing, the outermost rim 11A of end cap 11 is formed to extend downward to thereby define the outer curved surfaces of the air inlet passageways 18 at the top of the motor. The inner curved surfaces of the passageways 18 are defined by the outer leg portion 20A of baffle 20, which is positioned at least partially within the downwardly extending outermost rim 11A of the first end cap, as shown. In this embodiment, the rim 11A is spaced outwardly about one inch from the baffle leg portion 20A, but variations in this dimension will be found more suitable for different sized motors.

Others skilled in the art will recognize that various other modifications and improvements may be made in the ventilation means of the present invention without departing from the true spirit or scope of the invention herein; accordingly, it is my intention to define the limits of the invention within the following claims.

What I claim and desire to secure by Letters Patent of the United States is:

1. A vertical electric motor having a ventilation means that controls the mixing of intake air and exhaust air used as a motor coolant, comprising;
    a laminated stator, a stator winding mounted on the stator, a rotor mounted on an axial shaft journaled for rotation within the stator, and a housing including a central cylindrical element disposed about the stator and extending beyond both ends of the stator winding and further including first and second end caps mounted respectively on the top and bottom ends of said central element.
    a pair of generaly equivalent-volume fans mounted, respectively, on opposite ends of said rotor, said fans being effective when rotated to draw air into the housing through passageways formed at least partially by said end caps and being further effective to force air from the housing through exhaust ports,
    a motor ventilation means comprising means defining first air inlet passageways between the top end cap and the central housing element, and means defining second air inlet passageways through the bottom end cap, said first air inlet passageways in combination being in the range of about 10 to about 60 percent larger in cross-sectional area than the combined cross-sectional area of said second air inlet passageways, said first air inlet passageways being arranged to receive air flowing axially upward along the top, outer end of said central housing element, and said second air inlet passageways being arranged to receive air flowing radially inward with respect to the bottom, outer end of the cylindrical surface of said central housing element, and first and second annular baffles mounted respectively adjacent the top and bottom ends of the central housing element to direct air forced from the housing to flow in generally axially directed streams along the exterior surface of said central housing element,
    said ventilation means being effective to cause streams of air exhausted from the top and bottom ends of said motor to become mixed at a region adjacent the central housing element substantially closer to the bottom of the motor than to the top thereof, whereby a major portion of the turbulent hot exhaust air in said mixing region is prevented from undesirably pre-heating air entering the axially disposed inlet passageways adjacent the top of the motor.

2. A motor as defined in claim 1 wherein said baffles are generally U-shaped in cross-section through one side thereof but the outer leg portion of the first baffle is positioned to overlap and extend axially downward along the top end of said central housing element, and the outer leg portion of the second baffle is positioned so it does not overlap or extend upward along the bottom end of said central housing element.

3. A motor as defined in claim 2 including wall means defining a plurality of apertures through the bottom portion of the second baffle between the upwardly extending sides thereof, said apertures being effective to bleed some of the exhaust air from the main exhaust stream leaving the bottom of the motor thereby to limit the upward force of said exhaust stream to partially determine the vertical position of said exhaust air mixing region below the center of said central housing element, 4. A motor as defined in claim 3 wherein said plurality of apertures comprises at least 4 apertures formed at points on said second baffle spaced approximately 90° from one another.

5. A motor as defined in claim 2 wherein the top end of the inner leg portion of said second baffle extends upward past the lower end of said central housing element, whereby air is forced to enter the second baffle in a more nearly axial path, relative to the central housing portion, than air leaving the second baffle is forced to travel past the short outer leg portion thereof which allows exhaust air to flow outward in a more radial path.

6. A motor as defined in claim 2 wherein said first end cap is generally circular in outline and has a diameter that substantially exceeds the diameter of siad central housing portion, the outermost rim of the first end cap being formed to extend downward thereby to define the outer curved surfaces of the air inlet passageways at the top of said motor, the outer leg portion of said first baffle being positioned at least partially within the downwardly extending outermost rim of the first end cap thereby to define the inner curved surfaces of said axially oriented first air inlet passageways.

7. A motor as defined in claim 6 wherein said central housing element includes a plurality of axially extending spaced ribs that project outwardly therefrom to form axial channels for receiving some of the air exhausted from the motor housing, the outer leg portion of said first baffle being formed to overlie at least ⅛ inch of the upper outermost surfaces of said ribs.

8. A motor as defined in claim 1 wherein said exhaust air mixing region comprises an annular band surrounding said central housing element.

9. A motor as defined in claim 8 wherein the first and second air outlet passageways are proportioned in cross-sectional areas with the same range of relative size differences as is applied to the corresponding air inlet passageways.

* * * * *